US008288915B2

(12) United States Patent  
Dollé et al.

(10) Patent No.: US 8,288,915 B2
(45) Date of Patent: Oct. 16, 2012

(54) MULTI-PART THROUGH BOLTS OF STATOR CORE

(75) Inventors: Benoit Dollé, Hèrimoncourt (FR); Stéphane Fendeleur, Bavilliers (FR); Hubert Lotz, Ventron (FR)

(73) Assignee: Alstom Technology Ltd., Baden (CH)

( * ) Notice: Subject to any disclaimer, the term of this patent is extended or adjusted under 35 U.S.C. 154(b) by 223 days.

(21) Appl. No.: 12/731,849

(22) Filed: Mar. 25, 2010

(65) Prior Publication Data

US 2010/0244619 A1   Sep. 30, 2010

(30) Foreign Application Priority Data

Mar. 30, 2009   (EP) .................................... 09156531

(51) Int. Cl.
*H02K 1/18* (2006.01)
*H02K 1/04* (2006.01)

(52) U.S. Cl. ... 310/216.127; 310/216.113; 310/216.129; 411/388

(58) Field of Classification Search ........... 310/216.129, 310/427, 216.127, 216.113, 216.131, 216.132, 310/216.133, 418, 428, 431; 411/388
See application file for complete search history.

(56) References Cited

U.S. PATENT DOCUMENTS

| 1,851,572 | A | * | 3/1932 | Ehrenfeld | 310/411 |
| 2,506,637 | A | * | 5/1950 | Fog | 336/210 |
| 2,977,491 | A | * | 3/1961 | Hueffed et al. | 310/414 |
| 4,192,352 | A | * | 3/1980 | Hakamada et al. | 138/149 |
| 4,227,109 | A | * | 10/1980 | Mulach | 310/216.114 |
| 4,538,084 | A | * | 8/1985 | Kawada et al. | 310/410 |
| 4,845,836 | A | | 7/1989 | Butler, III | |
| 2009/0195116 | A1 | * | 8/2009 | Pong | 310/216.129 |

FOREIGN PATENT DOCUMENTS

| AU | 534421 B2 | 1/1984 |
| CN | 201125916 Y | 10/2008 |
| EP | 1522743 A1 | 4/2005 |

\* cited by examiner

*Primary Examiner* — Burton Mullins
(74) *Attorney, Agent, or Firm* — Volpe and Koenig, P.C.

(57) ABSTRACT

A through bolt is provided for a magnetic core of a generator stator, which is insertable in a bore provided in the stator core lamination for maintaining the tightness of the core components. The through bolt includes at least two longitudinal through bolt elements which are interconnected via at least one connecting element. Further, a method for assembling a separable through bolt for a magnetic core lamination of a generator stator is described. Thus the drawbacks of the prior art are avoided and an improved solution for replacement of the through bolts located under the level of the floor foundation is provided. Further, no special tooling or lifting of the frame are required which makes such replacement easy and cost efficient.

13 Claims, 4 Drawing Sheets

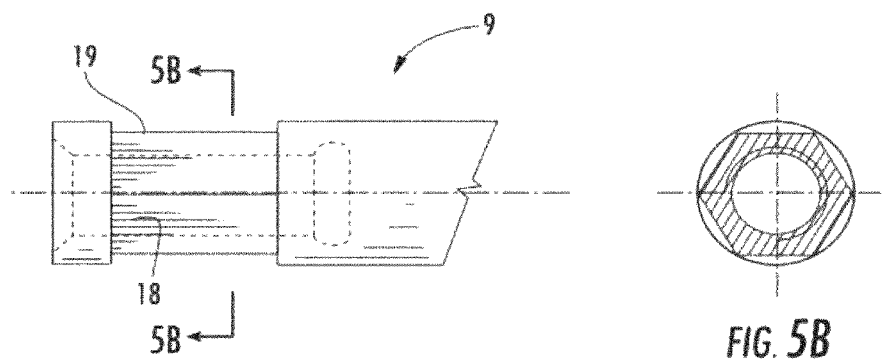
FIG. 5A
FIG. 5B
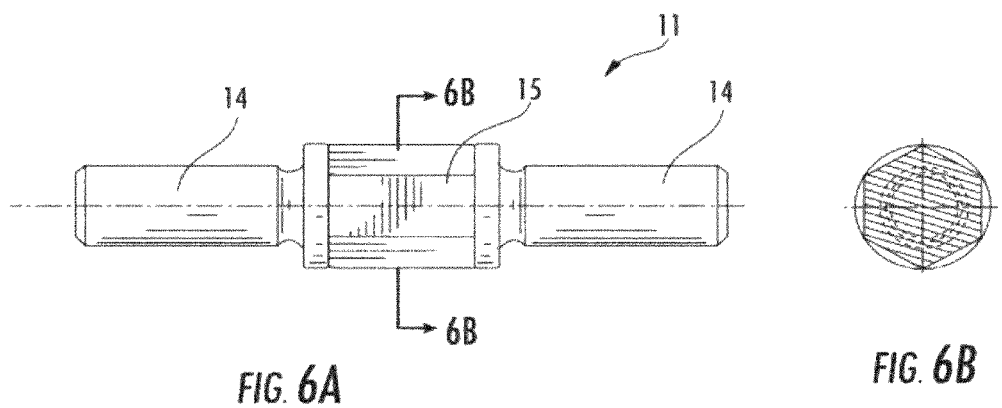
FIG. 6A
FIG. 6B

MULTI-PART THROUGH BOLTS OF STATOR CORE

FIELD OF INVENTION

The present invention relates to a through bolt for a magnetic core of a generator stator, which is insertable in a bore provided in the stator core lamination for maintaining the tightness of the core components. Further, the present invention relates to a method for assembling a separable through bolt for a magnetic core lamination of a generator stator, the through bolt consisting of several individual elements

BACKGROUND

Large generators have stator cores, which usually comprise many axially thin annular laminations that are assembled together and compressed to form a cylindrical stator core supported in a frame. Known magnetic cores of some types of such generator stators require the installation of longitudinal bolts to maintain the tightness of the core components. These bolts are arranged parallel to the stator axis and are distributed over the outer and inner circumference of the magnetic core. The bolts are called "through bolts" and extend axially through bores provided in the stator core lamination. The through bolts are provided with nuts on both axial ends of the through bolts which are torqued or hydraulically tensioned to hold the core support system in assembled position. Further, the through bolts are generally wrapped with dielectric insulation.

The relaxation of these through bolts or defects of the lamination will affect the integrity of the stacked core. If the tension of the through bolts is lost, re-tightening of the bolts could be insufficient. In such a case the replacement of the through bolts is required. Other cases where replacement of the through bolts becomes necessary is the retrofitting of the generator.

However, often the generator is located in a space below the normal floor level. Thus, difficulties often arise due to the lack of clearance between the end of the stator core and the wall of the foundation or floor level of the building. Such an absence of clearance prevents the axial alignment for insertion of the through bolts into the bores of the stator core. To overcome the lack of clearance, one solution suggests to lift the frame together with the core to obtain the clearance necessary to introduce the through bolts.

Alternatively U.S. Pat. No. 4,845,836 suggests using a special apparatus for feeding a through bolt through the bores of a stator core while initially feeding the same towards the end of the bore along a line forming an acute angle with the axis of the bore. The apparatus uses several rollers to deflect the through bolts from the acute angle at which they are fed and coaxially align them with the axis of the bore. The apparatus according to U.S. Pat. No. 4,845,836 is relatively complicated and the method is very troublesome to use, especially if all of the through bolts need to be replaced.

SUMMARY

In a first aspect, the disclosure is directed to a through bolt for a magnetic core of a generator stator. The bolt is insertable in a bore provided in a stator core lamination for maintaining tightness of core components. The through bolt includes at least two longitudinal through bolt elements which are interconnected via at least one connecting element.

In a second aspect, the disclosure is directed to a method for assembling a separable through bolt for a magnetic core lamination of a generator stator. The through bolt is made up of several individual elements. The method includes feeding longitudinal through bolt elements into bores provided in the core lamination. The method also includes connecting the longitudinal through bolt elements with connecting elements during introduction into the bores.

In a third aspect, the disclosure is directed to a generator stator including a plurality of laminations, forming a magnetic core. The laminations each have at least one bore. The stator also including at least one through bolt inserted in the at least one bore. The through bolt includes at least two longitudinal through bolt elements which are interconnected via at least one connecting element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5a shows a partial detail view of one end of a longitudinal through bolt element;

FIG. 5b shows sectional view V-V from FIG. 5a;

FIG. 6a shows a detail view of a connecting element;

FIG. 6b shows sectional view VI-VI from FIG. 6a;

FIG. 7a shows a sectional view of one end of a glass fiber tube; and

FIG. 7b shows a sectional view of the opposite end of the glass fiber tube from FIG. 7a.

DETAILED DESCRIPTION OF THE PREFERRED EMBODIMENTS

Introduction to the Embodiments

Figure 1:
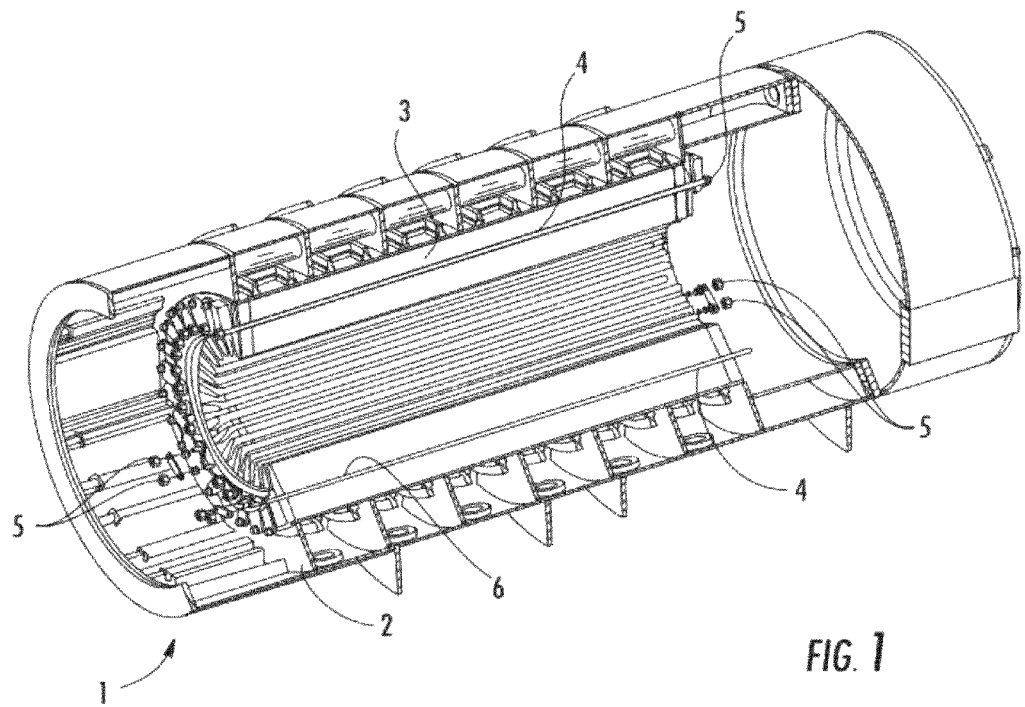
FIG. 1 shows a schematic perspective and partly sectional view of a generator stator having through bolts according to the present invention.

Accordingly, the technical problem to be solved by the present invention is to avoid the drawbacks of the prior art and to provide an improved solution for replacement of the through bolts located under the level of the floor foundation. Further, no special tooling or lifting of the frame shall be required to make such replacement easy and cost efficient.

This problem is solved by a device and a method as set forth in the appended claims.

A through bolt for a magnetic core of a generator stator is provided, which is insertable in a bore provided in the stator core lamination for maintaining the tightness of the core components. The inventive through bolt is comprises at least two longitudinal through bolt elements which are interconnected via at least one connecting element.

Thus the drawbacks of the prior art are avoided and an improved solution for replacement of the through bolts located under the level of the floor foundation is provided. This is mainly achieved by providing a separable through bolt for a magnetic core lamination of a generator stator, the through bolt consisting of several individual elements. The maximum length of the individual elements should be defined by the available space between the generator stator and the foundation walls and/or the available space between generator stator and the turbine. Further, no special tooling or lifting of the frame are required which makes such replacement easy and cost efficient. The interconnection of the elements may be effected by different means, e.g. by using a bayonet coupling, a form-fit coupling or other suitable connecting means.

An advantageous embodiment of the present invention suggests that the longitudinal through bolt elements are made of a high tensile alloy. Due to this, high tensile stress can be sustained without fatigue of the through bolt material and hence without the need of early replacement of the bolts.

Another preferred embodiment suggests that the longitudinal through bolt elements are made of a non-magnetic alloy. This way the through bolt will not affect the electro-magnetic generator design.

A further advantageous embodiment of the present invention suggests that at least one end of the longitudinal through bolt elements is provided with an internal thread. This way the longitudinal through bolt elements can be threadingly connected with each other. A screw like connection is easily designed and easily assembled using only tools generally available at a generator site. The outer longitudinal bolt elements will often be provided with an external thread on one end for the nut to be torqued from the outside once the bolt is finally fit into the bore. However, the inner longitudinal through bolt element(s) may have two internal threads to be interconnected on both ends via threaded connecting elements.

Still another advantageous embodiment of the present invention suggests that the two ends of the connecting element are provided with external threads. The connecting element may have a longitudinal shape, but generally much shorter than the longitudinal through bolt elements. It can be made from high tensile material, preferably a high tensile alloy which can be surface treated after the external threads are machined or rolled into the two opposite ends of the connecting element. For securing the threading connection with the internal threads of the longitudinal through bolt elements, locking washers and/or counter nuts may be used.

One highly advantageous aspect of this embodiment is that the connecting element is provided with a center piece having a hexagonal shape. The center piece of the connecting element may have a larger diameter than the two ends of the connecting element. The hexagonal shape facilitates the use of a regular wrench or a hydraulic spanner to assemble the connecting element together with a longitudinal through bolt element while mounting the separable through bolt in a bore. Of course, also alternative ways are possible for turning the connecting element like a screw, for instance small bores could be provided in the center portion of the connecting element which are arranged perpendicular to the axis of the connecting piece. Into these bores, a bar could be inserted as a turning lever for assembly.

Further, it is advantageous that the interconnected longitudinal through bolt elements are surrounded by a dielectric insulation. The dielectric insulation avoids short circuits in the generator stator which could potentially be caused by the through bolts if not insulated. Further, the dielectric insulation prevents the assembling staff from being endangered by electric voltage. One possibility way to apply a dielectric insulation would be an insulating wrapping around the through bolt during insertion into the bore. However, this has the draw back that the wrapping might be damaged or unwrapped when inserting the bolt into the bore.

Therefore, it is advantageous that the dielectric insulation is made of fiber reinforced tubes. The tubes can be manufactured by manually laminating fiber reinforced material with epoxy resin. A preferred dielectric reinforcement material could be for example glass fiber. The fiber reinforced tubes not only provide dielectric insulation but also provide certain stiffness and rigidity to avoid unwrapping or damaging of the insulation material during insertion into the bore. Additionally, the several individual tubes are easily interconnected during assembly of the through bolt since the ends of the tubes are provided with bushings which can also serve as portions to apply glue.

Further, it is advantageous that the fiber reinforced tubes have a lining with low friction factor, e.g. PTFE (polytetrafluoroethylen). The lining with low friction factor improves the sliding capabilities of the fiberglass tubes during mounting on the longitudinal through bolt elements and protects the through bolts from being damaged.

Finally, it is advantageous that the through bolt is made from at least three longitudinal through bolt elements and two connecting elements. The two outer longitudinal through bolt elements are non symmetric, i.e. towards the outside ends the longitudinal bolt elements have external threads to be threadingly connected with bolts, as shown in the figures. The inner ends of the longitudinal through bolt elements have internal threads to be threadingly connected with connecting elements. The inner longitudinal through bolt element has on both ends internal treads to be connectable via respective connecting elements with the two outer longitudinal through bolt elements.

The method according to the present invention for assembling a separable through bolt for a magnetic core lamination of a generator stator, the through bolt consisting of several individual elements, includes the following steps:
feeding the longitudinal through bolt elements into bores provided in the core lamination;
connecting the longitudinal through bolt elements with connecting elements during introduction into the bores.

According to an advantageous embodiment of the inventive method, the longitudinal through bolt elements are threadingly connected with each other via connecting elements.

According to another advantageous embodiment of the inventive method, several individual insulating tubes are introduced together with the longitudinal through bolt elements into the bores and glued together for surrounding the through bolt.

DETAILED DESCRIPTION

Referring now to the drawings, wherein like reference numerals designate identical or corresponding parts throughout the several views, a first preferred exemplary embodiment of the invention is reproduced in FIG. 1 in a schematic perspective and partly sectional view of a stator 1. The drawings are merely schematic sketches and serve explicatory reasons only.

In this embodiment the stator 1 is arranged in an essentially cylindrical frame 2 having several ground supports. One end of the stator 1 is facing the turbine, the opposite end is facing the ground level wall. The stator 1 comprises many axially thin annular laminations 3 that are assembled together and compressed to form the cylindrical stator core. For explanatory reasons, the rotor, which is located coaxially inside the stator, is not shown.

In the generator stator 1 through bolts 4, are provided to maintain the tightness of the core components. These bolts 4 are arranged parallel to the stator axis and are distributed over the inner circumference of the magnetic core. The through bolts 4 extend axially through bores 6 provided in the stator core lamination 3. The through bolts 4 are provided with hydraulic nuts 5 on both axial ends of the through bolts which are torqued to hold the core support system in assembled position.

Further details may be taken from FIG. 2 through FIG. 7, which show the through bolt assembly 7 and the through bolt 4 interconnection in partial detail views.

Figure 2:
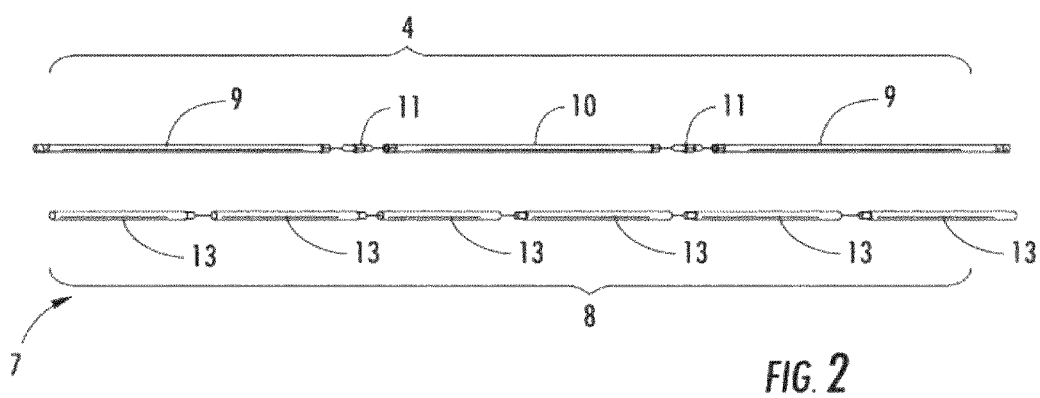
FIG. 2 shows an exploded view of assembly parts of through bolts according to the present invention as shown in FIG. 1.

In FIG. 2, three longitudinal through bolt elements 9, 10 are interconnected by two connecting elements 11. The two outer longitudinal through bolt elements 9 are non symmetric, i.e. towards the outside ends the longitudinal bolt elements 9 have external threads to be threadingly connected with hydraulic nuts 5, as shown in FIG. 1.

The inner ends of the longitudinal through bolt elements 9 have internal threads to be threadingly connected with connecting elements 11. The inner longitudinal through bolt element 10 has on both ends internal threads to be connectable via respective connecting elements 11 with the two outer longitudinal through bolt elements 9. A detail view of one end having an internal thread 18 is shown in FIG. 5*a* and FIG. 5*b*. The internal thread according to this embodiment is a size M 27. To hold the longitudinal bolt element in position during the assembly and to prevent it from rotating, the end portion comprises a hexagonal shaped section 19 suitable to be hold by a regular wrench of size 36. The longitudinal through bolt elements 9, 10 are made from a high tensile non-magnetic alloy which can be surface treated, e.g. nitrogen hardening. The longitudinal through bolt elements 9, 10 according to the preferred embodiment have a length in the range between 1500 mm and 2000 mm.

Figure 3:
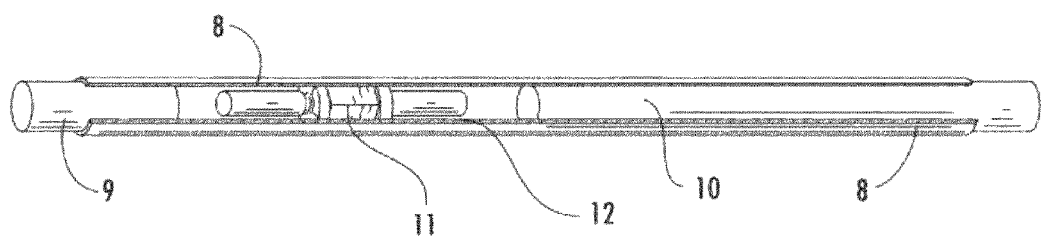
FIG. 3 shows a schematic perspective and partly sectional view of an assembled through bolt according to the present invention as shown in FIG. 1.
Figure 4:
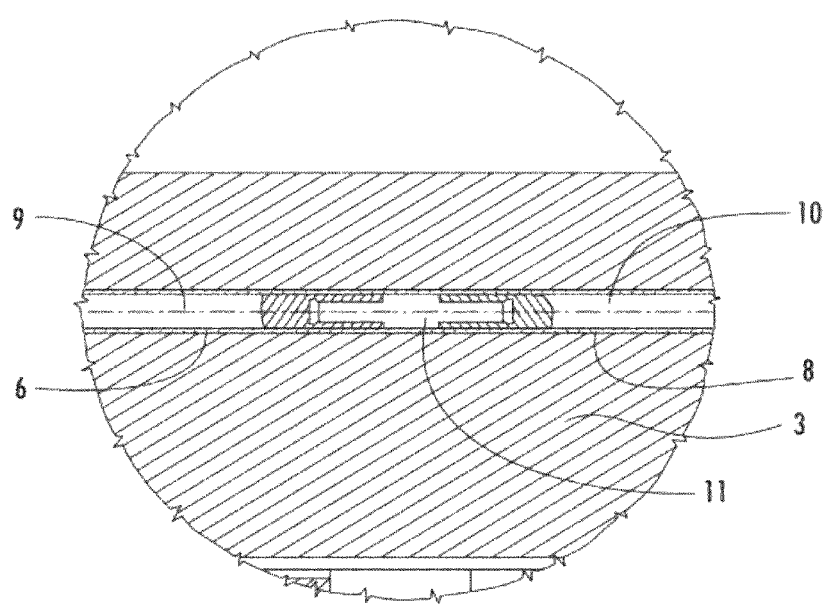
FIG. 4 shows a detailed sectional view of a through bolt interconnection according to the present invention as shown in FIG. 1.

As can be taken from FIG. 3 and FIG. 4 and especially from FIGS. 6*a* and 6*b*, the connecting element 11 according to this embodiment is a lathed and machined metal element with two opposite ends 14 having external threads. The center piece 15 of the connecting element 11 has a larger diameter than the threaded ends and is formed as a hexagon to provide the surface for a wrench or spanner. The connecting element 11 is in general longitudinally essentially cylindrically shaped. The connecting element 11 is made from a high tensile non-magnetic alloy which can be surface treated, e.g. by nitriding. The overall length of the connecting element 11 according to the present embodiment is 200 mm and the external threads have the size of M 27. The hexagonal shape of the center piece 15 is suitable for wrench size 36.

Figures 7A, 7B:
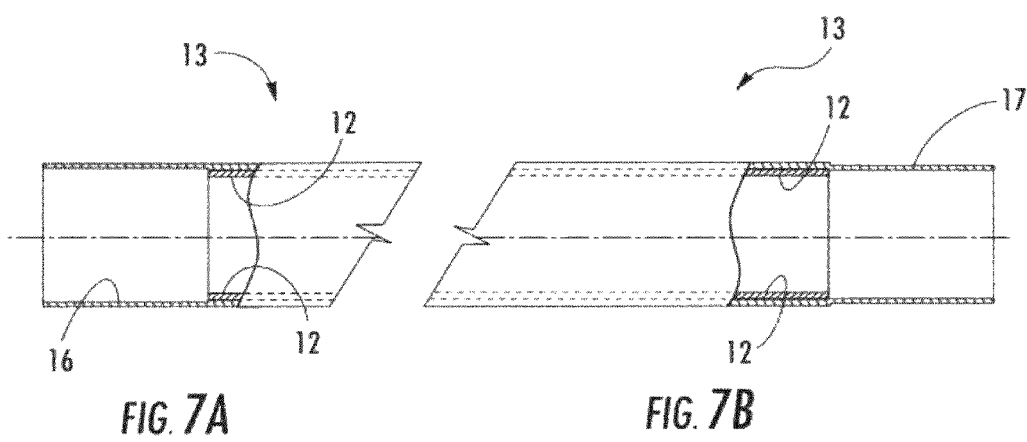

The through bolts 4 are surrounded by a dielectric insulation 8, which can be best viewed in FIG. 7*a* and FIG. 7*b*. The insulation according to this embodiment is made from fiberglass tubes 13 internally insulated with a PTFE lining 12. The fiberglass tubes 13 have a similar length as the longitudinal through bolt elements 9, 10 and are introduced in the bores 6 during introduction of the longitudinal through bolt elements 9, 10. The several fiberglass tubes 13 are glued to each other during insertion in the bores 6 by using a suitable glue, e.g. polyester resin or similar. The PTFE lining 12 improves the sliding capabilities of the fiberglass tubes 13 during mounting on the longitudinal through bolt elements 9, 10 and protects the through bolts 4 from being damaged. The PTFE lining 12 has a thickness of only a few microns, e.g. 0.20 mm. The dielectric insulation avoids short circuits in the generator potentially caused by the through bolts 4. Further, the dielectric insulation 8 prevents the assembling staff from being endangered by electric hazards.

As can be taken from FIG. 7*a*, the fiberglass tubes 13 are provided with a sleeve type end, a socket 16, having a larger inside diameter than the rest of the fiberglass tube 13 and no PTFE lining. The socket 16 end matches with another tube's end, a bushing 17 (as shown in FIG. 7*b*), having a smaller outer diameter than the rest of the fiberglass tube 13, so two fiberglass tubes 13 can be interconnected by fitting the bushing 17 end into the socket 16 end and applying glue to the connecting surface.

For mounting the through bolts 4 in the bores 6 of a generator stator 1, the longitudinal through bolt elements 9, 10 are fed into the bores 6. During feeding of the through bolt elements 9, 10 into the bores 6, the longitudinal through bolt elements 9, 10 are threadingly interconnected via the connecting elements 11. For the connection of the through bolt elements 9, 10 with the connection element 11 an adequate torque, which in the present advantageous embodiment is around 730 Nm, is applied to ensure the tensile strength required. Further, when feeding the longitudinal through bolt elements 9, 10, the dielectric insulation 8 is applied to these elements and the fiberglass tubes 13 which fit together are introduced, assembled and glued together during introduction thereof.

Clearly, numerous modifications and variations of the present invention are possible in light of the above teachings. It is therefore to be understood that, within the scope of the appended claims, the invention may be practiced otherwise than as specifically described herein.

Reference Numerals
1 stator
2 frame
3 core lamination
4 through bolt
5 nut
6 bore
7 through bolt assembly
8 dielectric insulation
9 longitudinal bolt element
10 longitudinal bolt element
11 connecting element
12 PTFE lining
13 fiberglass tube
14 connecting element end
15 center piece
16 socket
17 bushing
18 internal thread
19 hexagonal portion

What is claimed is:

1. Through bolt (4) for a magnetic core of a generator stator (1), which is insertable in a bore (6) provided in a stator core lamination (3) for maintaining tightness of core components, wherein the through bolt (4) comprises at least two longitudinal through bolt elements (9, 10) which are interconnected via at least one connecting element (11), at least one end of the at least two longitudinal through bolt elements (9, 10) is provided with an internal thread.

2. The through bolt (4) for a magnetic core of a generator stator (1) according to claim 1, wherein the at least two longitudinal through bolt elements (9, 10) are made of a high tensile alloy.

3. The through bolt (4) for a magnetic core of a generator stator (1) according to claim 1, wherein the at least two longitudinal through bolt elements (9, 10) are made of a non magnetic alloy.

4. The through bolt (4) for a magnetic core of a generator stator (1) according to claim 1, wherein the at least one connecting element (11) comprises two ends that are provided with external threads.

5. The through bolt (4) for a magnetic core of a generator stator (1) according to claim 1, wherein the through bolt (4) comprises at least three longitudinal through bolt elements (9, 10) and two connecting elements (11).

6. The through bolt (4) for a magnetic core of a generator stator (1), which is insertable in a bore (6) provided in a stator core lamination (3) for maintaining tightness of core components, wherein the through bolt (4) comprises at least two longitudinal through bolt elements (9, 10) which are interconnected via at least one connecting element (11), wherein the at least one connecting element (11) is provided with a center portion having a hexagonal shape.

7. The through bolt (4) for a magnetic core of a generator stator (1), which is insertable in a bore (6) provided in a stator core lamination (3) for maintaining tightness of core components, wherein the through bolt (4) comprises at least two longitudinal through bolt elements (9, 10) which are interconnected via at least one connecting element (11) wherein the at least two interconnected longitudinal through bolt elements (9, 10) are surrounded by a dielectric insulation (8) made of fiber reinforced tubes (13) having a lining (12) with low friction factor.

8. The through bolt (4) for a magnetic core of a generator stator (1) according to claim 7, wherein the fiber reinforced tubes (13) comprise a PTFE lining.

9. Generator stator (1) comprising a plurality of laminations (3), forming a magnetic core, the laminations each comprising at least one bore (6); and at least one through bolt (4), inserted in the at least one bore (6), the through bolt (4) comprising at least two longitudinal through bolt elements (9, 10) which are interconnected via at least one connecting element (11), at least one end of the at least two longitudinal through bolt elements (9, 10) is provided with an internal thread.

10. The generator stator (1) according to claim 9, wherein the at least two longitudinal through bolt elements (9, 10) are made of a high tensile, non-magnetic alloy.

11. The generator stator (1) according to claim 9, further comprising a dielectric insulation (8) that surrounds the at least two interconnected longitudinal through bolt elements (9, 10).

12. The generator stator (1) according to claim 11, wherein the dielectric insulation (8) is comprised of fiber reinforced tubes (13).

13. The generator stator (1) according to claim 12, wherein the fiber reinforced tubes (13) comprise a PTFE lining.

* * * * *